United States Patent [19]

Ladany

[11] 3,859,616
[45] Jan. 7, 1975

[54] TEMPERATURE CONTROL DEVICE

[76] Inventor: Shaul P. Ladany, 5700 Arlington Ave., Apt. 16J, Riverdale, Bronx, N.Y. 10471

[22] Filed: Nov. 1, 1973

[21] Appl. No.: 411,780

[52] U.S. Cl. ............ 337/300, 200/61.06, 236/44 C, 337/13
[51] Int. Cl. ............................................. H01h 37/02
[58] Field of Search ............... 236/44 C, 44 E, 91; 73/336, 337; 200/61.06; 337/12, 13, 23, 299, 300

[56] References Cited
UNITED STATES PATENTS

| | | | |
|---|---|---|---|
| 1,866,721 | 7/1932 | Pease | 73/337 X |
| 2,113,227 | 4/1938 | Bokeend | 337/300 |
| 2,191,630 | 2/1940 | Shutts | 200/61.06 |
| 2,563,341 | 8/1951 | Kettering | 73/336 X |
| 2,974,209 | 3/1961 | McMichael | 337/300 |
| 3,073,162 | 1/1963 | Ulanet | 73/337 |
| 3,312,398 | 4/1967 | Markham | 337/300 X |
| 3,399,569 | 9/1968 | Nakano | 73/336 |
| 3,673,867 | 7/1972 | Cashin et al. | 73/337 |

Primary Examiner—Arthur T. Grimley
Attorney, Agent, or Firm—Benjamin J. Barish

[57] ABSTRACT

The temperature control device described is humidity-compensated and comprises a temperature-sensitive element which changes its shape in response to changes in temperature, and a humidity-sensitive element which changes its shape in response to changes in humidity, each of the elements carrying an electrical contact, the two contacts being so disposed so as to be engageable with each other to close an electrical circuit under predetermined temperature and humidity conditions as sensed by the two elements.

4 Claims, 3 Drawing Figures

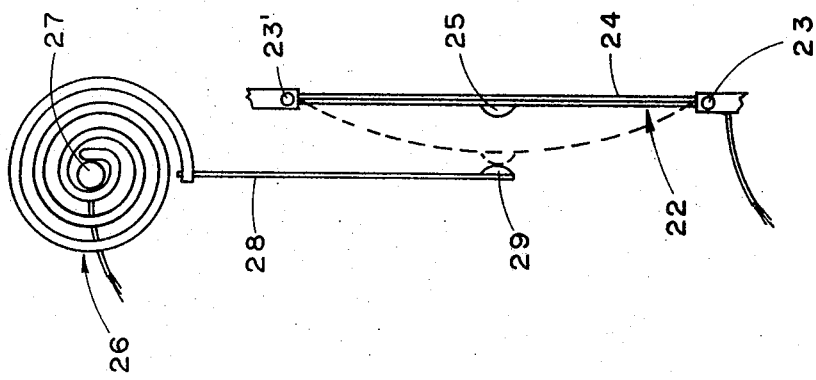
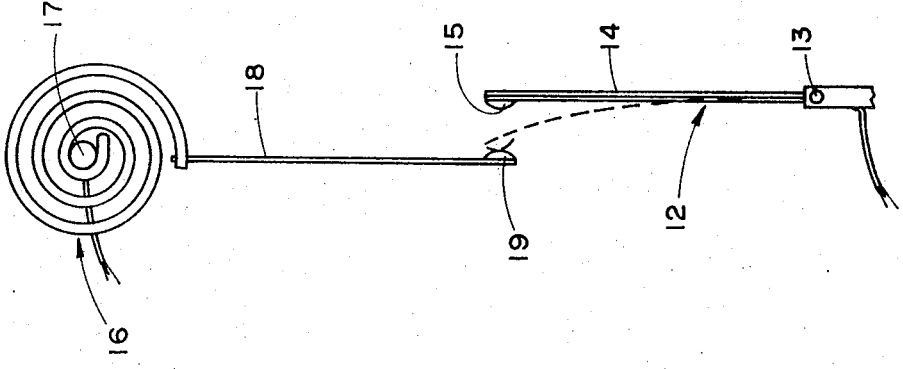
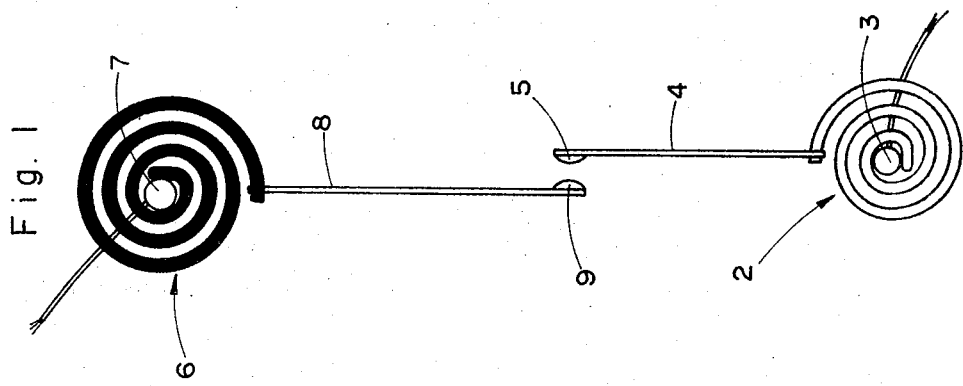

3,859,616

TEMPERATURE CONTROL DEVICE

BACKGROUND OF THE INVENTION

The present invention relates to temperature control devices. The invention may be advantageously used in a number of applications, one application as described below, being for heating systems for residential, office and other buildings.

Building heating systems commonly include temperature control devices or thermostats which sense the temperature of the heated room and control the heating unit, for example a gas-fired or oil-fired burner, to maintain a preselected comfortable temperature. However, not only the temperature of the room, but also its humidity, determines whether the room is comfortable. Thus, a room comfortable at one temperature, (e.g., 70°F) at a reasonably high humidity will be very uncomfortable and will feel too warm at the same temperature under substantially lower humidity.

BRIEF SUMMARY OF THE INVENTION

An object of the present invention is to provide a temperature-control device which automatically compensates for the humidity.

According to the present invention, there is provided a temperature control device comprising a temperature-sensitive element which changes its shape in response to changes in temperature, a first electrical contact carried by the temperature-sensitive element and movable in a first plane during changes in shape of the temperature-sensitive element, and a humidity-sensitive hygrometer coil adapted to wind and unwind during changes in humidity. The inner end of the hygrometer coil is fixed, and the outer end carries an extension which is movable by the change in shape of the hygrometer coil arising from changes in humidity. The extension carries a second electrical contact. The hygrometer coil and extension are substantially coplanar with the plane in which the first electrical contact moves so that changes in shape of the hygrometer coil causes the second electrical contact also to move in the same plane of movement of the first electrical contact. The arrangement is such that a decrease in humidity causes the second electrical contact carried by the hygrometer coil to move towards the first electrical contact to effect engagement between the two at a lower temperature, and an increase in humidity causes the second electrical contact to move away from the first electrical contact to effect engagement between the two at a higher temperature.

Thus, when the device is to be used for controlling the temperature of a heated building or room, the contacts are disposed so that a decrease in the sensed humidity causes the contacts to be closed at a lower temperature. Closing the contacts terminates the operation of the heater in this type of system, and therefore the temperature of the heated room or building will increase with increasing humidity, and will decrease with decreasing humidity. This produces a much more comfortable feeling for the occupants.

Several embodiments of the invention are described below.

In one described embodiment, the temperature sensitive element is in the form of a bimetallic coil, the inner end of which is fixed and the outer end of which includes an extension carrying the temperature electrical contact.

In a second described embodiment, the temperature-sensitive element is in the form of a bimetallic arm one end of which is fixed and the opposite end of which is bowable during temperature changes and carries the temperature electrical contact.

In a third described embodiment, the temperature-sensitive element is in the form of a bimetallic arm the two ends of which are fixed, and the middle portion of which is bowable during temperature changes and carries the temperature electrical contact.

Further features and advantages of the invention will be apparent from the description below.

BRIEF DESCRIPTION OF THE DRAWINGS

The invention is herein described, by way of example only, with reference to three preferred embodiments thereof illustrated in accompanying drawings, wherein:

FIG. 1 illustrates one form of temperature control device constructed in accordance with the invention; and FIGS. 2 and 3 illustrate two further forms of such devices.

DESCRIPTION OF THE PREFERRED EMBODIMENTS

The temperature control device illustrated in FIG. 1 comprises a temperature-sensitive element 2 in the form of a bimetallic coil which changes its shape in response to changes in temperature. The inner end of the bimetallic coil is fixed by screw 3 and the outer end includes a straight extension 4 which carries an electrical contact 5 at its outer tip.

Such bimetallic coils are well known for measuring or controlling temperature. Coil 2 in FIG. 1 is disposed so that its electrical contact 5 is deflected leftwardly with increasing temperature, and rightwardly with decreasing temperature.

The temperature control device further includes a humidity-sensitive element in the form of a hygrometer coil generally designated 6. Such coils are also well known in humidity-measuring devices. Its inner end is fixed by screw 7, and its outer end includes a straight extension 8 carrying an electrical contact 9 at its outer tip. The arrangement is such that the straight extension 8 and the electrical contact 9 carried thereby are moved leftwardly in FIG. 1 with increasing humidity, and rightwardly with decreasing humidity.

The humidity-senstive hygrometer coil 6 is substantially coplanar with the plane in which contact 5 moves and is disposed with respect to the temperature-sensitive bimetallic coil 2 such that the two electrical contacts 5 and 9 are adapted to come together to close an electrical circuit under predetermined humidity and temperature conditions. More particularly, with increasing humidity conditions, the soil winds or lightens, and the humidity electrical contact 9 moves away (e.g., leftwardly in FIG. 1) from the temperature electrical contact 5 so that a higher temperature must be sensed by the bimetallic coil 2 before the two contacts come together. On the other hand, when the humidity decreases, the coil loosens or unwinds, and the humidity electrical contact 9 moves towards (e.g., rightwardly in FIG. 1) the temperature electrical contact 5 so that engagement between the two contacts is effected at a lower temperature. Thus, the humidity-responsive hygrometer coil 6 compensates for changing humidity conditions, and causes the point of engagement of electrical contacts 5, 9, to be at a higher temperature with increasing humidity conditions and at a lower temperature with decreasing humidity conditions. As indicated earlier, this arrangement, when used in a building heating system, produces a much more comfortable feeling to the occupants.

FIG. 2 illustrates another embodiment of the invention. In this embodiment, the temperature-sensitive element is in the form of a bimetallic arm 12, one end 13 of which is fixed, and the opposite end 14 of which is bowable with temperature changes. The outer tip of the bowable end 14 carries the temperature electrical contact 15.

The humidity-sensitive element in the embodiment of FIG. 2 is the same as that in FIG. 1. It includes a hygrometer coil 16, the middle end of which is fixed at 17, and the outer end of which includes a straight extension 18 carrying the humidity electrical contact 19. As in FIG. 1, the arrangement in FIG. 2 is such that electrical contact 19 is deflected away from the electrical contact 15 (i.e., leftwardly in FIG. 2) with increasing humidity, and towards the electrical contact with decreasing humidity. Thus, as the humidity rises, the point of engagement of the two electrical contacts 15, 19, will be at a higher temperature; and as the humidity falls, it will be at a lower temperature. The regulated temperature will thus be compensated by changes in humidity as in the embodiment of FIG. 1.

FIG. 3 illustrates another embodiment, in which the temperature-sensitive bimetallic element is also in the form of an arm 22, but both ends 23, 23' are fixed, so that the middle portion 24 bows with changes in temperature. The middle portion 24 carries the temperature electrical contact 25.

The humidity-responsive element in the embodiment of FIG. 3 is also the same as that in FIGS. 1 and 2, and includes the hygrometer coil 26 fixed at its inner end 27, and including a straight extension 28 at its outer end, the tip of extension 28 carrying the humidity electrical contact 29.

The device illustrated in FIGS. 3 operates the same as in FIGS. 1 and 2, the point of engagement of the two electrical contacts 25, 29 being at a higher temperature with increasing humidity, and at a lower temperature with decreasing humidity.

The temperature control device of the present invention may also advantageously be used in other applications, for example, in an electrical toaster. Other modifications, variations and applications of the illustrated embodiments will be apparent.

What is claimed is:

1. A temperature control device comprising: a temperature-sensitive element which changes its shape in response to changes in temperature; a first electrical contact carried by said temperature-sensitive element and movable in a first plane during changes in shape of the temperature-sensitive element; a humidity-sensitive hygrometer coil adapted to wind and unwind during changes in humidity; the inner end of said hygrometer coil being fixed, and the outer end carrying an extension which is movable by the change in shape of the hygrometer coil arising from changes in humidity; and a second electrical contact carried by said extension of the hygrometer coil; said hygrometer coil and extension being substantially coplanar with said first plane in which the first electrical contact moves so that changes in shape of the hygrometer coil causes the second electrical contact also to move in said first plane of movement of the first electrical contact; the arrangement being such that a decrease in humidity causes the second electrical contact carried by the hygrometer coil to move towards the first electrical contact to effect engagement between the two at a lower temperature, and an increase in humidity causes the second electrical contact to move away from the first electrical contact to effect engagement between the two at a higher temperature.

2. A device according to claim 1 wherein said temperature-sensitive element is in the form of a bimetallic coil, the inner end of which is fixed and the outer end of which includes an extension carrying the temperature electrical contact.

3. A device according to claim 1 wherein said temperature-sensitive element is in the form of a bimetallic arm, one end of which is fixed and the opposite end of which is bowable during temperature changes and carries the temperature electrical contact.

4. A device according to claim 1 wherein said temperature-sensitive element is in the form of a bimetallic arm the two ends of which are fixed, and the middle portion of which is bowable during temperature changes and carries the temperature-electrical contact.

* * * * *